May 14, 1940.　　　　F. HINRICHS　　　　2,200,500
PIPE JOINT
Filed Feb. 25, 1939
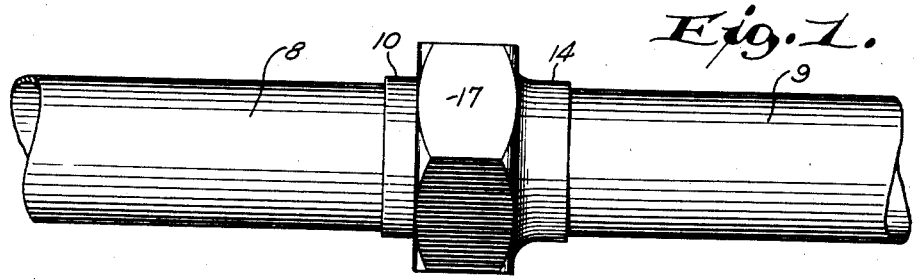
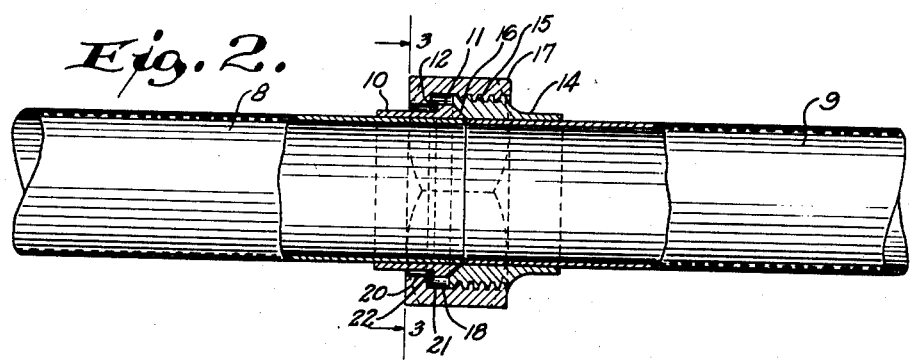
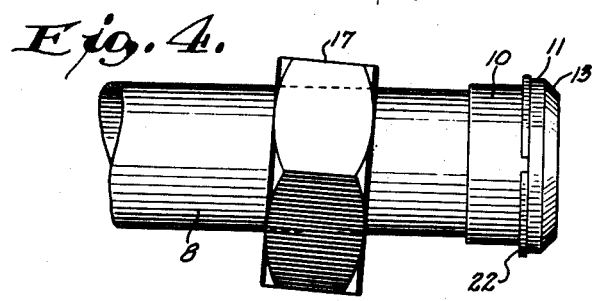
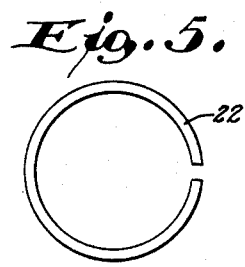
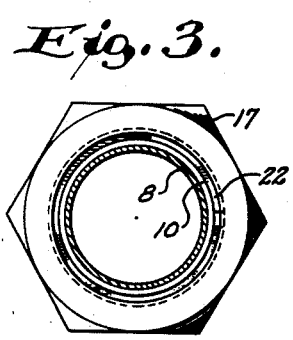
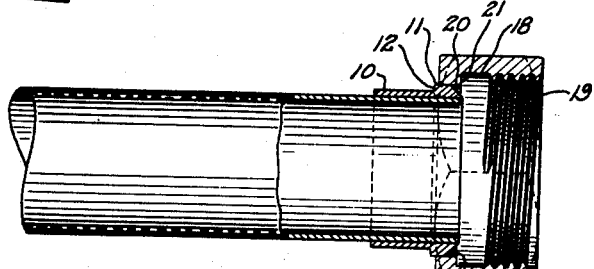
INVENTOR
Ferdinand Hinrichs
BY
ATTORNEYS.

Patented May 14, 1940

2,200,500

UNITED STATES PATENT OFFICE 2,200,500

PIPE JOINT

Ferdinand Hinrichs, Kenosha, Wis., assignor to Tri-Clover Machine Company, Kenosha, Wis., a corporation of Wisconsin Application February 25, 1939, Serial No. 258,379

1 Claim. (Cl. 285—122)

This invention relates to improvements in sanitary pipe joints. Heretofore it has been common practice, in providing for the connection of adjacent ends of two pipe sections or conduits, to form the end of one section with an annular flange, and to form the adjacent end of the other section with threading, which is cooperable with the threading of a union nut loosely surrounding the first section and cooperable with the annular flange thereon. Naturally, the flange has been of greater external diameter than the diameter of the bore of the union nut, through which the first pipe section extends, and, therefore, removal of the union nut from the pipe section is impossible. This is not only inconvenient but is highly objectionable when the pipe sections form part of a conduit for conveying milk or other like fluid wherein sanitation is required. The reason for this is that in dairy and food plants the pipe sections are taken down daily for cleaning, and the loose union nuts which cannot be removed from the sections slide back and forth on the sections during handling and cleaning and scratch the highly polished exterior finish.

Furthermore, it is difficult to properly clean the interior bores and threading of the union nuts while said nuts are on the pipe sections. In addition, the loose nuts, sliding back and forth on the pipe sections, are frequently damaged during such cleaning, necessitating replacement. When such replacement is required, either for the above reason or because the threads on the union nut have become injured or worn, it is now a difficult and lengthy procedure.

It is, therefore, a general object of the present invention to provide in a pipe joint means whereby the union nut may be readily removed from its pipe section to facilitate cleaning or replacement thereof, and to obviate the above mentioned other objectionable features of the non-removal union nut.

A more specific object of the invention is to provide in a pipe joint including a pipe section having an annular flange at an end thereof forming a shoulder, a union nut having its smallest bore of such diameter that it may be slipped over said flange, and a member removably insertable adjacent the flange shoulder after the union nut has been slipped into place for normally preventing removal of said union nut and for rendering said union nut effective in making a connection with the threaded end of an adjacent pipe section or other tubular fitting.

A further specific object of the invention is to provide a construction as above described wherein said removable member is a metallic ring, preferably of the split yieldable type, the external diameter of which is greater than the smallest diameter of the bore portion of the union nut through which the pipe section extends to form a stop cooperable with said union nut when the nut is being drawn up to effect a connection.

A still further specific object of the invention is to provide a construction as above described wherein the adjacent ends of the pipe sections to be connected have overlapping cooperating annular tapered surfaces for automatically alining the two pipe sections to effect a tight seal when the union nut is drawn up, in spite of the very loose fit of the improved union nut around one of the sections.

With the above and other objects in view the invention consists of the improved pipe joint and all of its parts and combinations as set forth in the claim and all equivalents thereof.

In the accompanying drawing illustrating one complete embodiment of the preferred form of the invention, in which the same reference numerals designate the same parts in all of the views:

Figure 1 is a side view showing adjacent pipe sections connected by the improved joint, said pipe sections being broken away;

Figure 2 is a similar view partially in longitudinal section;

Figure 3 is a cross sectional view taken on line 3—3 of Figure 2;

Figure 4 is a view showing the end of one of the sections with the union nut moved rearwardly to expose the retaining ring;

Figure 5 is a plan view of the retaining ring alone; and

Figure 6 is a view of the pipe section shown in Figure 4, partially in longitudinal section, showing the union nut being slipped over the flange after the retaining ring has been removed.

Referring more particularly to the drawing, the numeral 8 designates a first pipe section or tube, and the numeral 9 a similar adjacent section. The section 8 has a ferrule 10 slipped on to one end and permanently secured in position, and said ferrule is formed with an annular flange 11, the inner side of which forms a shoulder, as at 12, and the outer side of which is tapered, as at 13.

A ferrule 14 surrounds and is permanently connected to the end of the second pipe section 9, and said ferrule has a threaded portion 15 of increased diameter, the end of which projects beyond the end of the pipe section. Said projecting portion is formed with an annular tapered surface 16, which is cooperable with the tapered surface 13 on the flange of the first pipe section to effect a tight seal between the two pipe sections in the manner shown in Figure 2.

A union nut 17 has its main bore 18 threaded, as at 19, and said union nut has a bore 20 of smaller diameter, there being a shoulder 21 between the bores 18 and 20. Heretofore on pipe joints of this type it has been necessary to have the exterior diameter of the flange 11 greater than the diameter of the bore portion 20, and naturally this prevented removal of the union nut from the pipe section because the other end of the section 8 has a ferrule like the ferrule 14 on the section 9, the threaded portion of which is too large to permit removal of the union nut from said end. In the present construction the diameter of the bore 20 of the union nut is slightly greater than the external diameter of the flange 11, whereby the union nut may be removed from the end of the pipe section over said flange, as shown in Figure 6.

In normal use, however, suitable means is positioned adjacent the inner shoulder-forming side of the flange 11 to increase the effective diameter and normally prevent removal of the union nut, said means also co-acting with the union nut while it is being drawn up to effect a connection between two pipe sections. To accomplish this function it is preferred to use a metallic ring of greater external diameter than the diameter of the bore portion 20 of the union nut but of less external diameter than the diameter of the bore portion 18 of the union nut. A flexible or yielding split ring 22 is very satisfactory for the purpose, and by referring to Figure 2 it is apparent that this ring normally forms a shoulder for coaction with the shoulder 21 on the union nut.

When it is desired to remove the pipe sections for cleaning, the union nut 17 is unscrewed and pushed inwardly on the section 8, as illustrated in Figure 4. The split ring 22 is then spread, by the use of a screwdriver or other hand tool, and slipped over the flange 11 to remove the same from the pipe section. The metal of the ring is sufficiently yielding to permit its removal. After the ring has been removed from the pipe section, then the union nut may be readily withdrawn in the manner shown in Figure 6 because of the fact that the diameter of the bore portion 20 is slightly greater than the external diameter of the flange 20.

In order to accomplish this function the diameter of the bore portion 20 of the union nut is somewhat greater than is used in standard practice, and the external diameter of the flange 11 is somewhat less, and as a result of having the diameter of the bore portion 20 relatively large, said bore portion naturally fits very loosely around the ferrule 10, as shown in Figure 2. Because of this it is important that other means be utilized to insure proper alinement of the pipe sections when the union nut is being drawn up. This is accomplished by the cooperating and overlapping annular tapered surfaces 13 and 15, which cause automatic alinement of the two pipe sections as the union nut is tightened, and which effect a tight seal, in spite of the very loose fit between the union nut and the pipe section 8.

From the above it is apparent that the improved pipe joint is well suited for use in connection with milk pasteurizing equipment, or in connection with other equipment used for conveying fluids wherein sanitation is a factor. With the present invention the pipe sections may be easily taken down for cleaning, and the union nuts may be completely removed from the sections so that the internal threading of said union nuts may be thoroughly scrubbed. It is also apparent that during such cleaning there will be no union nut sliding back and forth on the pipe sections to mar the usual highly polished finish. In addition, the present invention makes it possible to easily replace damaged or worn union nuts.

Although only one form of the invention has been shown and described, it is apparent that various changes and modifications may be made without departing from the spirit of the invention, and all of such changes are contemplated as may come within the scope of the claim.

What I claim is:

In combination, a first tube, a ferrule surrounding an end of said tube, said ferrule having an annular flange adjacent its outer end, the inner side of said flange forming a shoulder, a second tube of the same internal diameter as said first tube, a ferrule surrounding an end of said second tube, said last mentioned ferrule having a threaded exterior portion, the end of the ferrule on one of said tubes having a tapered portion overlapping a portion of the ferrule of the other tube, said portion of the ferrule of the other tube having a complementary taper fitting therewithin to aline the two tubes and create a substantially smooth interior surface of uniform diameter at the joint, a union nut having a first bore through which the ferrule of the first tube extends and having a larger threaded bore for effecting a connection with the threaded ferrule of the second tube, said first bore portion being of greater diameter than the external diameter of the ferrule flange of the first tube so that the union nut may be removed from the end of the tube over said flange, and a removable split ring of greater diameter than the diameter of the smaller bore of the union nut and of less external diameter than the diameter of the larger threaded bore portion of the union nut positioned adjacent the flange shoulder and normally preventing removal of the union nut.

FERDINAND HINRICHS.